United States Patent
Dice

(10) Patent No.: US 8,914,620 B2
(45) Date of Patent: Dec. 16, 2014

(54) METHOD AND SYSTEM FOR REDUCING ABORT RATES IN SPECULATIVE LOCK ELISION USING CONTENTION MANAGEMENT MECHANISMS

(75) Inventor: David Dice, Foxboro, MA (US)

(73) Assignee: Oracle America, Inc., Redwood City, CA (US)

( * ) Notice: Subject to any disclaimer, the term of this patent is extended or adjusted under 35 U.S.C. 154(b) by 1023 days.

(21) Appl. No.: 12/345,162

(22) Filed: Dec. 29, 2008

(65) Prior Publication Data

US 2010/0169623 A1 Jul. 1, 2010

(51) Int. Cl.
*G06F 9/38* (2006.01)
*G06F 9/52* (2006.01)

(52) U.S. Cl.
CPC .............. *G06F 9/3842* (2013.01); *G06F 9/528* (2013.01); *G06F 9/526* (2013.01)
USPC ........................................................ 712/225

(58) Field of Classification Search
CPC ...................................................... G06F 9/528
See application file for complete search history.

(56) References Cited

U.S. PATENT DOCUMENTS

| | | | |
|---|---|---|---|
| 6,799,236 B1 | 9/2004 | Dice et al. | |
| 6,862,664 B2 * | 3/2005 | Tremblay et al. | 711/137 |
| 7,669,040 B2 * | 2/2010 | Dice | 712/225 |
| 2006/0053351 A1 * | 3/2006 | Anderson et al. | 714/100 |
| 2007/0136289 A1 | 6/2007 | Adl-Tabatabai et al. | |
| 2007/0143755 A1 | 6/2007 | Sahu et al. | |
| 2007/0186215 A1 * | 8/2007 | Rajwar et al. | 718/102 |
| 2007/0198519 A1 | 8/2007 | Dice et al. | |
| 2008/0059717 A1 * | 3/2008 | Saha et al. | 711/144 |
| 2008/0065864 A1 * | 3/2008 | Akkary et al. | 712/225 |
| 2008/0288819 A1 * | 11/2008 | Heller, Jr. | 714/19 |
| 2009/0172306 A1 * | 7/2009 | Nussbaum et al. | 711/154 |
| 2009/0307466 A1 * | 12/2009 | Barsness et al. | 712/220 |
| 2010/0138836 A1 * | 6/2010 | Dice et al. | 718/101 |
| 2010/0138841 A1 * | 6/2010 | Dice et al. | 718/107 |

OTHER PUBLICATIONS

Marzulo et al. "Transactional WaveCache: towards speculative and out-of-order dataflow execution of memory operations" 2008 20th International Symposium on Computer Architecture and High Performance Computing (SBAC-PAD), Campo Grande, MS, Brazil, Oct. 29-Nov. 1, 2008.*

(Continued)

*Primary Examiner* — Jacob A Petranek
(74) *Attorney, Agent, or Firm* — Robert C. Kowert; Meyertons, Hood, Kivlin, Kowert & Goetzel, P.C.

(57) ABSTRACT

Hardware-based transactional memory mechanisms, such as Speculative Lock Elision (SLE), may allow multiple threads to concurrently execute critical sections protected by the same lock as speculative transactions. Such transactions may abort due to contention or due to misidentification of code as a critical section. In various embodiments, speculative execution mechanisms may be augmented with software and/or hardware contention management mechanisms to reduce abort rates. Speculative execution hardware may send a hardware interrupt signal to notify software components of a speculative execution event (e.g., abort). Software components may respond by implementing concurrency-throttling mechanisms and/or by determining a mode of execution (e.g., speculative, non-speculative) for a given section and communicating that determination to the hardware speculative execution mechanisms, e.g., by writing it into a lock predictor cache. Subsequently, hardware speculative execution mechanisms may determine a preferred mode of execution for the section by reading the corresponding entry from the lock predictor cache.

20 Claims, 4 Drawing Sheets

(56) References Cited

OTHER PUBLICATIONS

Rajwar et al. "Speculative Lock Elision: Enabling Highly Concurrent Multithreaded Execution" Proceedings of the 34th International Symposium on Microarchitecture (MICRO), Dec. 3-Dec. 5, 2001.*

McDonald et al. "Architectural Semantics for Practical Transactional Memory" Computer Architecture News, {Comput-ArchitNews-USA}, May 2006, vol. 34, No. 2, p. 53-64.*

Wang et al. "Software Assisted Transact Cache to Support Efficient Unbounded Transactional Memory" 2008 10th IEEE International Conference on High Performance Computing and Communications (HPCC), Dalian, China, Sep. 25-27, 2008.*

Guerraoui, et al., "Robust Contention Management in Software Transactional Memory," Proc. of the OOPSLA 2005 Workshop on Synchronization and Concurrency in Object-Oriented Languages, 2005.

Scherer, III, et al., "Advanced Contention Management for Dynamic Software Transactional Memory," Proc. of the 24th Annual ACM Symposium on Principles of Distributed Computing, 2005, pp. 240-248.

Rajwar, et al., "Speculative Lock Elision: Enabling Highly Concurrent Multithreaded Execution," Appears in the Proceedings of the 34th International Symposium on Microarchitecture (MICRO), Dec. 3-5, 2001, Austin, TX, 12 pages.

Rajwar, et al., "Transactional Lock-Free Execution of Lock-Based Programs," Appears in the Proc. of the 10th International Conf. on Architectural Support for Programming Languages and Operating Systems (ASPLOS), Oct. 6-9, 2002, San Jose, CA, 13 pages.

Ansari, et al., "Adaptive Concurrency Control for Transactional Memory," 2008, 12 pages.

David Dice, et al., "Applications of the Adaptive Transactional Memory Test Platform," 2008, 10 pages.

Martinez, et al., "Speculative Synchronization: Applying Thread-Level Speculation to Explicitly Parallel Applications," ASPLOS X 10;/02, San Jose, CA, 2002 ACM ISBN 1-58113-574-2/02/0010 . . . , 12 pages.

Hammond, et al., "Transactional Memory Coherence and Consistency," ISCA-31, 2004, 12 pages.

U.S. Appl. No. 12/325,870, filed Dec. 1, 2008.

U.S. Appl. No. 12/327,659, filed Dec. 3, 2008.

Ansari, et al., "Experiences using adaptive concurrency in transactional memory with Lee's routing algorithm," Proceedings of the 13th ACM SIGPLAN Symposium on Principles and practice of parallel programming, 2008.

\* cited by examiner

METHOD AND SYSTEM FOR REDUCING ABORT RATES IN SPECULATIVE LOCK ELISION USING CONTENTION MANAGEMENT MECHANISMS

BACKGROUND OF THE INVENTION

1. Field of the Invention

This invention relates generally to transactional memory computer systems and, more specifically, to a system and method for using software contention management to reduce abort rates in hardware-based transactional memory systems, such as those implementing speculative lock elision.

2. Description of the Related Art

Due to the complexity and energy concerns of modern processors, traditional approaches to boosting CPU performance have become difficult and ineffective. Instead of attempting to drive up clock speeds, computer architects are increasingly turning to multi-threading techniques such as symmetric multi-threading or multi-core architectures. In order to leverage these new architectures, software engineers must write applications that execute using multiple concurrent threads of execution. Unfortunately, correct multi-threaded programming is notoriously difficult using traditional language constructs.

Shared-memory systems allow multiple threads to access and operate on the same shared memory locations. To maintain consistency, threads must often execute a series of instructions as one atomic block, or critical section. In these cases, care must be taken to ensure that other threads do not observe memory values from a partial execution of such a block. To ensure correctness, threads may use traditional constructs, such as mutual exclusion and locks, to exclude all other threads from concurrent access to a critical section protected by the same lock(s). For example, no thread may enter a critical section without holding the section's lock. While it does, all other threads wishing to execute a critical section protected by the same lock must await the lock's release and acquire it before proceeding. The pitfalls of these constructs are numerous and well known. They include deadlock, race conditions, priority inversions, software complexity, and performance limitations.

Alternatively, it may be possible to increase parallelism by allowing multiple threads to execute critical sections protected by the same lock concurrently if the executions do not rely on overlapping memory locations. Doing so may increase performance and mitigate many of the pitfalls normally associated with traditional locking mechanisms. However, such interleaved executions are not guaranteed to be correct.

Transactional memory is a mechanism that can be leveraged to enable concurrent and correct execution of a critical section by multiple threads. Transactional memory allows a thread to execute a block of instructions as a transaction, that is, either completely and atomically or not at all. The instructions are executed and then either "committed", allowing the aggregate effect to be seen by all other threads, or "aborted", allowing no effect to be seen. A transaction that has committed successfully may be said to have "succeeded". If an attempt to execute a transaction aborts, it may be retried.

Speculative lock-elision (SLE) and similar hardware-based, implicit speculative execution techniques (e.g., Transactional Lock Removal, Speculative Synchronization, etc.) may automatically and transparently convert existing, lock-based, critical sections to transactions by recognizing instructions normally found at the start of each critical section and executing those critical sections speculatively and non-exclusively. Thus, rather than acquiring locks and executing serially, multiple threads, even of applications that are SLE-unaware, may concurrently execute critical sections protected by the same lock. However, if a data conflict occurs during speculative execution, a transaction may be aborted. For example, if a transaction speculatively reads a value from memory, and that value is modified before the transaction commits, then the transaction may be aborted.

In addition to conflict aborts, aborts may also result when SLE implementations misidentify sections of code as critical sections that should be executed as transactions. For example, an atomic compare-and-swap (CAS) instruction is often used to acquire a lock at the beginning of a critical section. Currently available SLE implementations may switch to speculative execution mode whenever execution encounters a CAS instruction. However, some CAS instructions are executed for purposes other than lock acquisition. In such cases, the SLE implementation would mistakenly identify the CAS instruction as signifying the start of a critical section and enter speculative execution mode. Since no corresponding instruction sequence exists to "commit" the misidentified critical section, the speculative execution would eventually fail. In some cases, the SLE implementation may even reattempt the section using speculative execution. Such attempts are futile and represent wasted system resources and degraded overall system performance.

SUMMARY

Hardware-based transactional memory systems, such as Speculative Lock Elision (SLE), may allow multiple threads to concurrently execute critical sections protected by the same lock as speculative transactions. However, transactional aborts due to conflicts may occur in such systems, and may cause performance degradation. In addition, traditional SLE may misidentify critical sections and thereby waste system resources by making repeated, futile speculative execution attempts that eventually abort. In various embodiments, a hardware-based transactional memory system, such as SLE, may be augmented with software and/or hardware contention management mechanisms to reduce transactional abort rates. In some embodiments, a hardware transactional memory system may be configured to detect that a transaction has aborted or will abort and respond by sending a signal, such as a hardware interrupt, to one or more software components. The signal may be detected, or "trapped", by a software component such as an operating system kernel. In such embodiments, an operating system may define a default hardware interrupt handler. In some embodiments, a default hardware interrupt handler may send additional software interrupt signals to other software components, such as one or more application-specific signal handlers. In some embodiments, application-specific handlers may be defined as part of an application.

In some embodiments, the system may be configured to permit an application to dynamically register one or more application-specific signal handlers (e.g., at runtime) to handle given types of interrupts and/or signals. For example, in various embodiments, software components may be signaled when a transaction aborts, when a transaction begins, and/or when a transaction completes successfully. Each such handler may be configured to respond to aborts and/or other transactional execution or speculative execution events associated with a given region of code.

In various embodiments, software contention management mechanisms, such as interrupt handlers or signal handlers, may be configured to implement one or more concurrency throttling mechanisms, such as a local backoff scheme. For example, in such embodiments, a signal handler associated with a given critical section may receive an indication that an attempt to execute that critical section speculatively has aborted. In response, the signal handler may determine an appropriate interval by which to delay before returning control to the code that caused the abort. In some embodiments, the abort handler may implement a backoff-based concurrency throttling mechanism over the critical section.

In some embodiments, software components may be configured to determine a mode of execution for one or more critical sections (e.g., speculative execution mode, mutual exclusion mode, etc.) in response to a signal from the hardware-based transactional memory system and to communicate that determination back to the hardware-based transactional memory system. In various embodiments, this communication may involve inserting and/or updating values in one or more hardware structures, such as lock predictor cache. In other embodiments, software components may augment the instruction stream in order to pass execution-mode hints to hardware speculative execution components, for example, by inserting special-purpose program instructions.

In some embodiments, a lock predictor cache may contain entries that are each associated with a respective critical section, locking site, and/or instruction. The entries may each be indexed by an identifier, such as the location in memory of an atomic instruction that indicates the start of a critical section. Each entry value may include an indication of the preferred mode of execution for the corresponding section of code (e.g., speculative or non-speculative). A hardware-based speculative execution mechanism, such as a traditional SLE mechanism, may be augmented to locate and read such entries from a lock predictor cache before executing a corresponding critical section. If the cache entry exists, a speculative execution mechanism may read it and attempt to execute the critical section using the preferred mode of execution indicated by the entry. If an entry does not exist in the lock predictor cache, then the speculative execution mechanism, lock predictor cache, or other hardware component may insert a default entry into the lock predictor cache. For example, a new entry may always indicate that speculative execution is the preferred mode for executing the corresponding critical section.

In some embodiments, each lock predictor cache entry may identify a preferred mode of execution directly. In other embodiments, it may contain data that may be interpreted by other hardware mechanisms, such as the speculative execution components, in order to determine a preferred mode of execution. According to various embodiments, lock predictor caches may have different sizes, levels of associativity, and/or operate according to different eviction/replacement policies.

Figure 1:
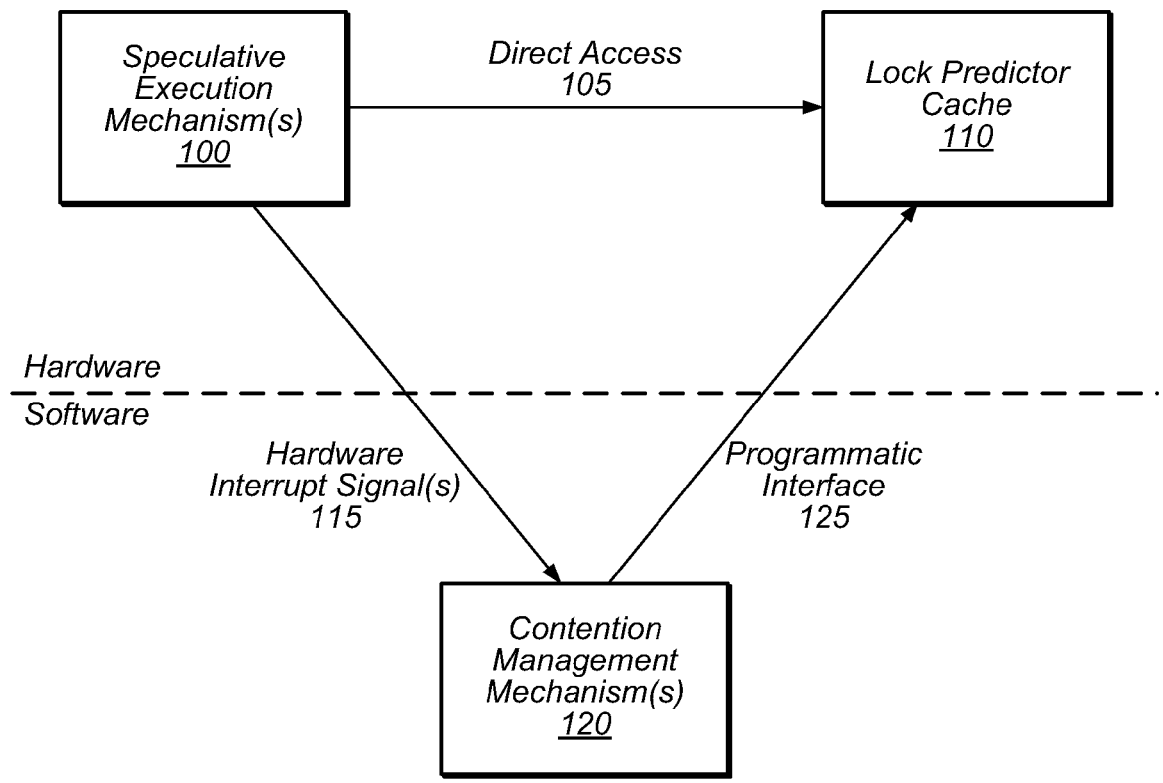
FIG. 1 is a flowchart illustrating a method for using hardware and software interrupts to implement SLE with software contention management, according to various embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

Some hardware transactional memory systems, such as those employing SLE techniques, may allow a programmer to use simple coarse-grained locking and still enjoy performance benefits that may normally be associated with more complex concurrency schemes. The use of SLE may also improve performance in a multi-threaded system by increasing parallelism, thereby allowing multiple threads to make progress over critical sections concurrently and without waiting for locks. However, performance may degrade if aborts are frequent. Furthermore, in the case of mutual aborts, it may be possible that no thread successfully commits its attempt to execute a transaction and the resulting performance may even be worse than that of a system that uses only traditional locks. In some cases, traditional SLE may misidentify a section of code as critical. In such cases, speculative execution of the misidentified critical section may abort, leading to degraded system performance.

In various embodiments, an SLE implementation may be augmented with software and/or hardware contention management mechanisms to reduce transactional abort rates. In some embodiments, contention management mechanisms may be used to decide if a thread should execute a critical section speculatively or by the use of mutual exclusion. In some instances, the contention management mechanism may determine that execution should essentially be downgraded from a speculative execution mode to a mode that employs traditional blocking mutual exclusion. This policy may provide starvation avoidance, since at least the lock holder is guaranteed to make progress. Furthermore, executing a section using mutual exclusion rather than speculation may be necessary when a critical section contains an instruction that cannot, or should not, be executed speculatively (e.g., those containing I/O instructions). In such cases, contention management mechanisms, in various embodiments, may cause threads arriving at those critical sections to execute using mutual exclusion.

In various embodiments, contention management mechanisms may include mechanisms for throttling transactional retry rates, thereby reducing the level of concurrency over one or more locks. In some embodiments, contention management mechanisms may limit the number of threads permitted to elide a given lock at any one time. For example, k-exclusion may be used, whereby only k threads are permitted to elide a given lock concurrently. In another example, a group mutual exclusion algorithm may be used to control how many threads (and of which type) may elide a lock concurrently. In other embodiments, contention management mechanisms may implement a local backoff scheme similar to that used in traditional networking protocols such as Ethernet or variations thereof. In such embodiments, if a transaction aborts, the thread may retry after a short delay interval. In some embodiments, the delay interval may be adapted to runtime conditions.

In various embodiments, SLE mechanisms may be augmented by, and interact with, one or more software and/or hardware contention management components. FIG. 1 illustrates a high level overview of the components of a system configured to implement SLE in combination with contention management according to one embodiment. The embodiment pictured in FIG. 1 includes three main components: speculative execution mechanism(s) 100, lock predictor cache 110, and contention management mechanism(s) 120. As indicated in FIG. 1, speculative execution mechanism(s) 100 and a lock predictor cache 110 may be comprised of hardware components while contention management mechanisms 120 may include one or more software components. While in some embodiments, the system may include components 100-120 (as pictured in FIG. 1), in other embodiments, the system may include only speculative execution mechanism(s) 100 and lock predictor cache 110, while still others may include only speculative execution mechanism(s) 100 and software contention management mechanism(s) 120. In some embodiments, the system may include additional hardware components not shown in FIG. 1, such as special purpose registers and/or any other components with which software mechanism(s) 120 may share data with hardware components, such as speculative execution mechanism(s) 100.

Speculative execution mechanism(s) 100 may in some embodiments include hardware mechanisms to detect critical sections in programs and execute those critical sections in speculative execution mode. Speculative execution mechanisms 100 may include mechanisms to roll back aborted execution and to commit successful transactions, as in traditional SLE implementations.

Unlike traditional SLE mechanisms, however, in various embodiments, speculative execution mechanisms 100 may communicate with one or more software contention management mechanisms 120 and/or a lock predictor cache 110, as illustrated in FIG. 1. In some embodiments, speculative execution mechanisms 100 may communicate with software contention management mechanisms 120 by sending one or more hardware interrupt signals 115. Such signals may be sent in response to various SLE events, such as the start, commit, and/or abort of an attempt to execute a transaction. Contention management mechanisms 120 may in some embodiments include one or more software mechanisms configured to determine and/or assist in determining a mode of execution for critical sections encountered during execution. In some embodiments, software mechanisms included in contention management mechanisms 120 may implement one or more throttling mechanisms. For example, speculative execution mechanisms 100 and contention management mechanisms 120 may interact in a manner similar to the method illustrated in FIG. 2, and described in detail later.

As shown in FIG. 1, in various embodiments, speculative execution mechanisms 100 and/or contention management mechanisms 120 may be configured to interact with one or more hardware contention management mechanisms, such as lock predictor cache 110. Software components, such as contention management mechanisms 120, may interact with a lock predictor cache though a direct programmatic interface, shown as 125. Because they are implemented in hardware, speculative execution mechanisms 100 may, in some embodiments, access a lock predictor cache 110 directly via hardware constructs, as in 105.

In some embodiments, a lock predictor cache may be configured to map identifying information about a critical section, such as the address of an atomic instruction that begins the critical section, to one or more dynamic hints about the preferred mode of execution for that section. For instance, one entry in a lock predictor cache may indicate that a critical section that begins at a certain address should be executed speculatively if SLE is appropriate (i.e., if the lock is not being held, etc.). Another entry in the cache may indicate that a critical section that begins at a certain address should be executed using traditional mutual exclusion.

In some embodiments, an entry in a lock predictor cache may correspond to an instruction that does not begin a critical section. For example, a CAS instruction that does not acquire or release a lock may cause a traditional SLE implementation to misidentify the section of code beginning at the CAS instruction as being a critical section. The traditional SLE implementation may then attempt, and fail, to execute the section of code speculatively. In some embodiments, an entry in a lock predictor cache may correspond to such an instruction and may indicate that the section of code beginning with the corresponding CAS instruction should not be executed speculatively.

These execution mode hints may be updated dynamically by software contention management mechanisms (e.g., 120), by speculative execution mechanisms (e.g., 100), and/or by the lock predictor cache 110 itself, in various embodiments. For example, if a critical section is executed speculatively, a hardware or software mechanism may be configured to record the result (e.g., an indication of the success or failure of a speculative execution attempt) in a cache entry. If the same critical section is encountered subsequently, the SLE implementation may retrieve the corresponding cache entry and execute the critical section according to the value of the entry. In various embodiments, a lock predictor cache may be used to track any number of recent successes and/or failures of speculative execution of a given critical section. For example, in some embodiments, the lock predictor cache may capture aggregate metrics, such as the cumulative failure rate of a given locking site. In some embodiments, speculative execution mechanisms may reference the information captured in the lock predictor cache in order to determine a preferred mode of execution for a given critical section.

In some embodiments, each entry in a lock predictor cache 110 may include a key by which the entry is indexed and a value, such as an execution mode hint. In other embodiments, an entry may include only a value; i.e., the key for each entry may be implicit. For example, an entry may be indexed by (i.e., the entry key is based on) the position of the entry in the cache. In some embodiments, a lock predictor cache 110 may associate other data with each entry, such as historical execution data. Such historical data may be used to in determining the execution mode for a given critical section in a more sophisticated manner.

Figure 2:
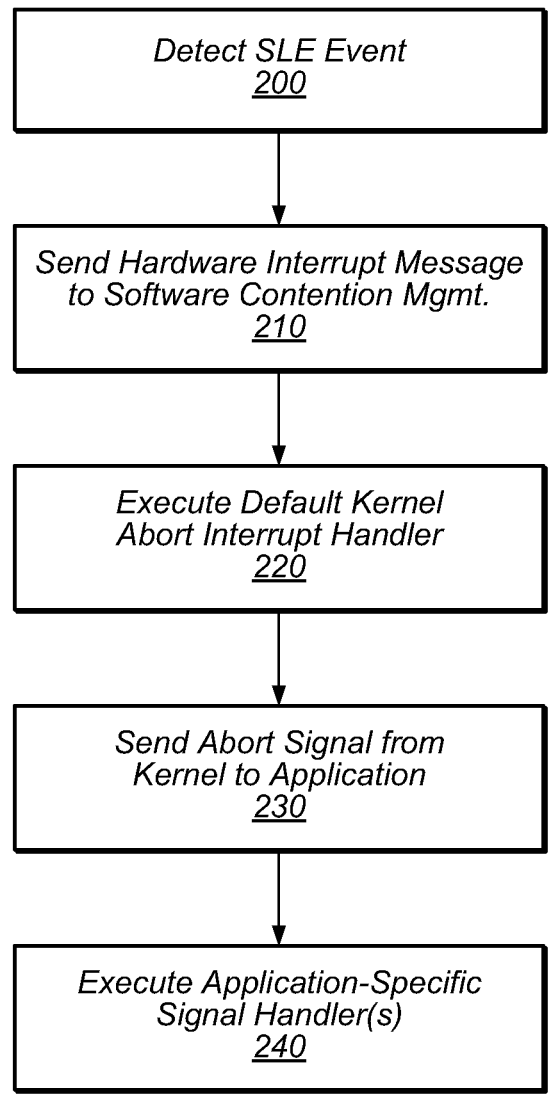
FIG. 2 is a flowchart illustrating a method for implementing a lock predictor cache, according to various embodiments.

FIG. 2 illustrates a method for implementing SLE in combination with software contention management, according to various embodiments. In various embodiments, the method may be executed in response to an SLE event, such as the start, successful commit, and/or abort of an attempt to execute a transaction. For example, if an attempt to execute a transaction aborts, then a speculative execution mechanism, such as speculative execution mechanism 100 of FIG. 1, may detect the abort, as in 200, and send a hardware interrupt signal, such as hardware interrupt 115 of FIG. 1, to one or more software contention management mechanisms (such as software contention management mechanisms 120 of FIG. 1), as in 210. In some embodiments, the speculative execution mechanism may also perform other functions subsequent to detecting an SLE event, such as rolling back the processor state in response to an abort. Rolling back processor state may include loading previous values into general and/or special purpose registers, clearing the processor's execution pipeline, and/or other modifications to processor state.

In some embodiments, the hardware interrupt signal sent in 210 may be handled, or "trapped", by various software components, such as an operating system kernel. A trap may be implemented as a hardware interrupt signal, or any other signal from the hardware that shifts the control flow of a processor's execution from an application thread into the operating system kernel. In other embodiments, the interrupt signal may shift control to a hypervisor, virtual machine monitor, or any virtual operating system kernel. In embodiments in kernel-less operating systems, a hardware interrupt may be handled by other parts of the operating system. In some embodiments, SLE events other than aborts may trigger an interrupt signal to be sent from the hardware to the kernel. For example, when a processor shifts into speculative execution mode, the hardware speculative execution mechanism may generate and send a hardware interrupt signal to the kernel. In various embodiments, any number of SLE-related interrupt types may be defined and indications thereof sent by the hardware to inform software contention management mechanisms of the occurrence of the corresponding SLE events, such as transactional aborts and/or commits.

In various embodiments, a kernel, or other primary interrupt handler, may execute a default abort handler, as in 220. The default abort handler may execute default contention management operations. For example, the default abort handler may be configured to record that speculative execution of the given lock site has failed and/or to provide feedback to other components of the SLE implementation by modifying one or more values in one or more hardware constructs, such as a lock predictor cache 110 (shown in FIG. 1).

In some embodiments, the default kernel abort handler may send a signal to the application indicating an event, as in 230. For example, the signal may indicate a software-generated interrupt, such as those used for inter-process notifications in UNIX-style and/or other POSIX-compliant operating systems. In various embodiments, an application may define and/or specify one or more application-specific signal handlers to handle each type of signal received from the kernel. The signal handlers may be registered by the application dynamically at runtime. In some embodiments, an application may register signal handlers to handle SLE-related hardware interrupts directly, rather than relying on them being handled first by the kernel and/or through a kernel interrupt handler (e.g., as in 220-230). In such embodiments, an abort and/or other SLE-related event may trigger generation and/or transmission of a hardware interrupt signal that is handled directly by an application-specific signal handler or that is passed from a kernel to an application-specific signal handler.

In some embodiments, one or more application-specific signal handlers may receive the signal sent in 230 and respond by executing contention management operations, as in 240. In some embodiments, an application may register a single default signal handler to handle every SLE-related signal from the kernel and/or interrupt from the hardware. According to other embodiments, the application may define different default handlers for various types of SLE-related signals and/or interrupts. In response to receiving a signal, a default SLE signal handler may perform default contention management operations and/or deflect the signal to a regional signal handler, which may be configured to handle the signal for the specific region of code being executed. Thus, signal handlers may thus be arranged hierarchically in some embodiments. The hierarchy may contain any number of levels and any number of signal handlers at each level, in different embodiments. In some embodiments, a signal handler may determine which regional handler should handle a given request by consulting a data structure, such as an AVL tree, which may correlate request handlers with various regions of an application.

As previously noted, software contention management mechanisms, such as contention management mechanisms 120 of FIG. 1, may in some embodiments implement one or more concurrency throttling mechanisms. For instance, a signal handler may implement a local backoff scheme for each thread whereby the handler delays a thread's execution of a critical section by increasingly long intervals each time speculative execution of the critical section by the thread is aborted. In some embodiments, a signal handler may implement such a back-off scheme by delaying for a determined interval before returning control to the application thread. In some embodiments, an application-specific signal handler may be configured to record the abort or other event(s) indicated by the signal and/or to analyze historical execution data when making contention management decisions. For example, if the signal handler determines that a given critical section tends to abort under certain conditions, it may delay execution of that critical section while those conditions are true.

In some embodiments, software contention management mechanisms (e.g., signal handlers) may provide feedback to hardware components of the SLE implementation (e.g., speculative mechanisms 100 of FIG. 1) by inserting, deleting, and/or modifying one or more values in one or more hardware constructs, such as a lock predictor cache 110. As shown in FIG. 1, software mechanisms, such as signal handlers, may insert, delete, and/or modify values in a hardware component though a direct programmatic interface, such as direct programming interface 125, described above.

In some embodiments, software contention management mechanisms may provide feedback adding, deleting, or otherwise modifying the instruction stream to indicate the mode in which a critical section should be executed (e.g., speculatively, mutual exclusion). For example, software mechanisms may insert specialized instructions at the start of a critical section, which indicate that the given section should always be executed speculatively.

Figure 3:
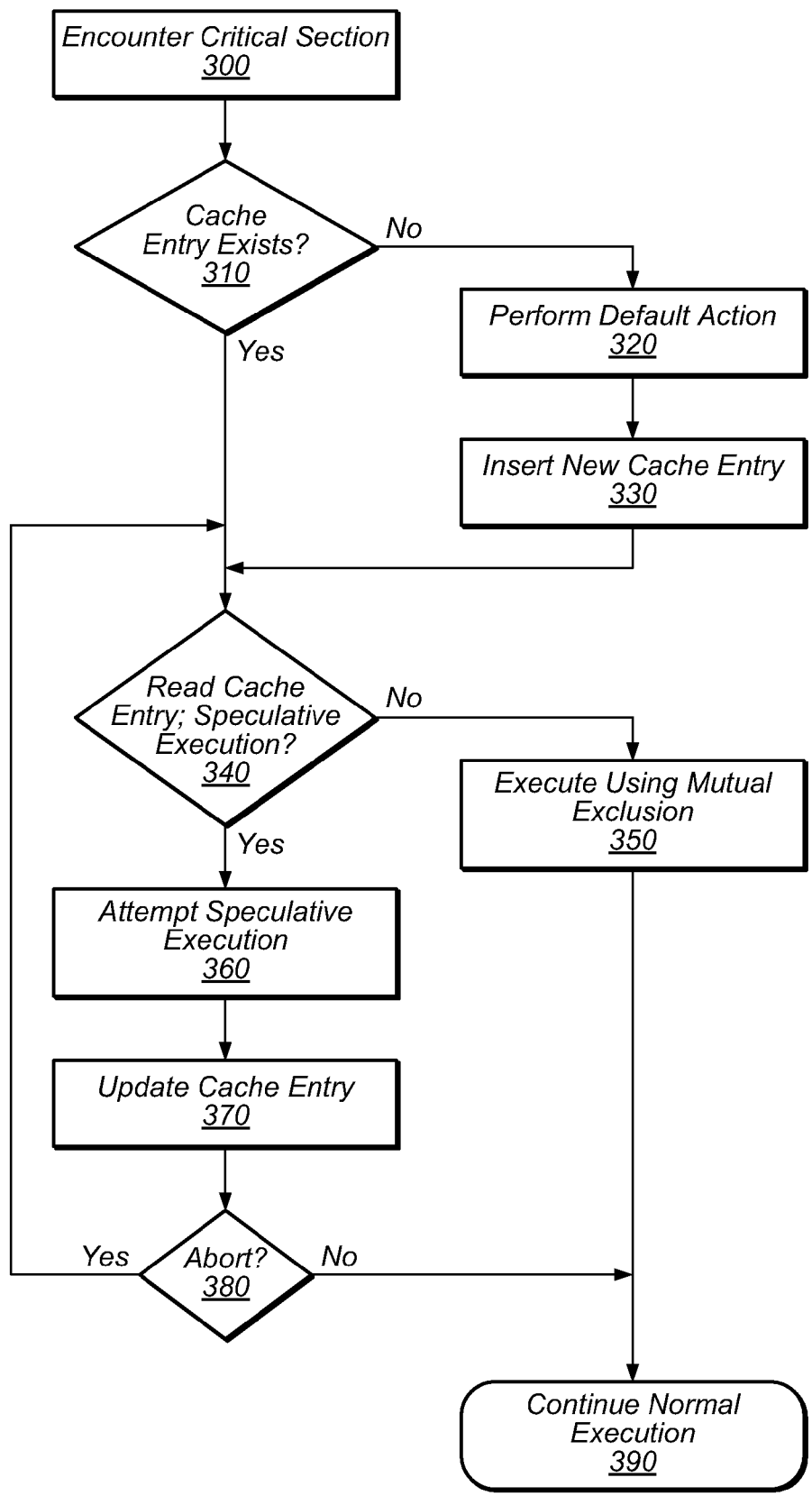
FIG. 3 illustrates the organization and interaction of the components of a system configured to implement SLE with contention management, according to some embodiments.

FIG. 3 illustrates a method for augmenting a speculative execution mechanism 100, such as an SLE implementation, with a lock predictor cache, such as lock predictor cache 110, in accordance with some embodiments. The illustrated method may be performed when thread execution encounters a critical section, as in 300. In this example, the SLE implementation may be configured to determine if an entry for the encountered critical section exists in the predictor cache, as in 310. In some embodiments, the SLE implementation may locate the cache entry using the address of the atomic operation that signals the start of the critical section. An atomic operation that begins a critical section may correspond to the acquisition of a lock for the section. In various embodiments, entries in a lock predictor cache may be indexed by the memory address of an instruction in the critical section (e.g., the first instruction in the critical section), by a part of the instruction's address, by a hash of the instruction's address, and/or by any other data that may be used to identify the critical section. In some embodiments, such an identifier may be unique to the critical section among all other critical sections that may be executed on the processor. In other embodiments, the identifier may not be strictly unique. In various embodiments, a lock predictor cache may be direct-mapped, fully associative, or set-associative in a manner similar to that of data caches or instruction caches.

If an entry does not exist for the given critical section, as indicated by the negative exit from 310, the system may perform one or more default actions, as in 320. In some embodiments, a default action may include executing the critical section using mutual exclusion. In other embodiments, a default action may include the hardware generating an interrupt (as in 210 of FIG. 2), which may be trapped by the kernel and/or handled by one or more interrupt handlers (as in 220-240 of FIG. 2). In yet other embodiments, the default action may include inserting a new cache entry corresponding to the encountered critical section into the lock predictor cache, as in 330. In some embodiments, a new cache entry may, by default, indicate that the corresponding critical section should be executed speculatively.

A lock predictor cache may have a maximum capacity, which may differ across embodiments. If the cache is full, then inserting a new cache entry may include evicting an existing entry. Various eviction/replacement policies may be used to determine which entry should be evicted when a new entry is inserted into a full cache. In one embodiment, the least recently used entry may be evicted. In another embodiment, a random entry may be evicted. Various embodiments may implement other policies, which may be based on such factors as the size and/or processing time of the corresponding critical sections, the value of the entry, relationships between critical sections, or combinations of such factors. For example, if speculative execution of one critical section aborts more frequently than speculative execution of a second critical section, it may be beneficial to evict the entry associated with the second critical section rather than evict the entry associated with the first critical section, if the default behavior is to execute speculatively.

If a cache entry corresponding to the encountered critical section exists in the lock predictor cache (as in the affirmative exit from 310) or if a new one is created for the encountered critical section (as in 330), then the system may read that entry and use the entry value in determining a mode of execution (e.g., speculative or mutual exclusion), as in 340. In various embodiments, the entry may indicate that a particular mode of execution, such as mutual exclusion or speculative execution, is preferred for the critical section. In other embodiments, the entry may include data that the hardware may analyze in order to derive a preferred mode of execution for the critical section. For example, the entry may include execution mode history for the corresponding critical section, which may be analyzed by other hardware components to determine a preferred mode of execution for that critical section. In some embodiments, this may operate in manner similar to that of a branch predictor. In some embodiments, one or more software contention management mechanisms (e.g., signal handlers) and/or hardware contention management mechanisms may write execution mode recommendations and/or execution history data into a lock predictor cache.

If a cache entry indicates that the critical section should be executed using mutual exclusion, as in the negative exit from 340, then the critical section may be executed using mutual exclusion, as in 350, and the thread may continue normal execution past the critical section, as in 390. In various embodiments, a hardware mechanism may be configured to record that the critical section has been executed using mutual exclusion in part of the cache entry and/or to associate it with the critical section in other hardware constructs and/or software data structures.

If the cache entry indicates that the critical section should be executed speculatively, as in the affirmative exit from 340, then the processor may attempt to execute the critical section speculatively, as in 360. The speculative execution may either succeed or fail. In either case, the lock predictor cache entry associated with the critical section may be updated, by software and/or hardware mechanisms, as in 370. For example, if the speculative execution has failed, then one or more hardware mechanisms may be configured to modify the cache entry to indicate that future executions of the critical section should use mutual exclusion. In some embodiments, such hardware mechanisms may be configured to modify the cache entry to indicate that an attempt to execute the critical section speculatively has either failed or succeeded. In some embodiments, in response to a failure (i.e., an abort of the speculative execution), the hardware mechanisms may be configured to send a hardware interrupt signal, as in 210 of FIG. 2. This interrupt signal may be handled by one or more software contention management mechanisms, such as signal and/or interrupt handlers in the kernel and/or application, as in 220-240 of FIG. 2. In such embodiments, software contention management mechanisms 120 may update data in the lock predictor cache, via a direct interface, as in 125 of FIG. 1. In some embodiments, software contention management mechanisms 120 may implement one or more throttling mechanisms at this point. For example, one or more software contention management mechanisms 120 may be configured to delay for an appropriate interval in response to receiving a hardware interrupt signal and/or another signal.

If the speculative execution was successful, as indicated by the negative exit from 380, then execution may continue after the critical section, as in 390. If speculative execution was not successful, as indicated by the affirmative exit from 380, the system may loop back to decision 340 and read the updated cache entry.

Figure 4:
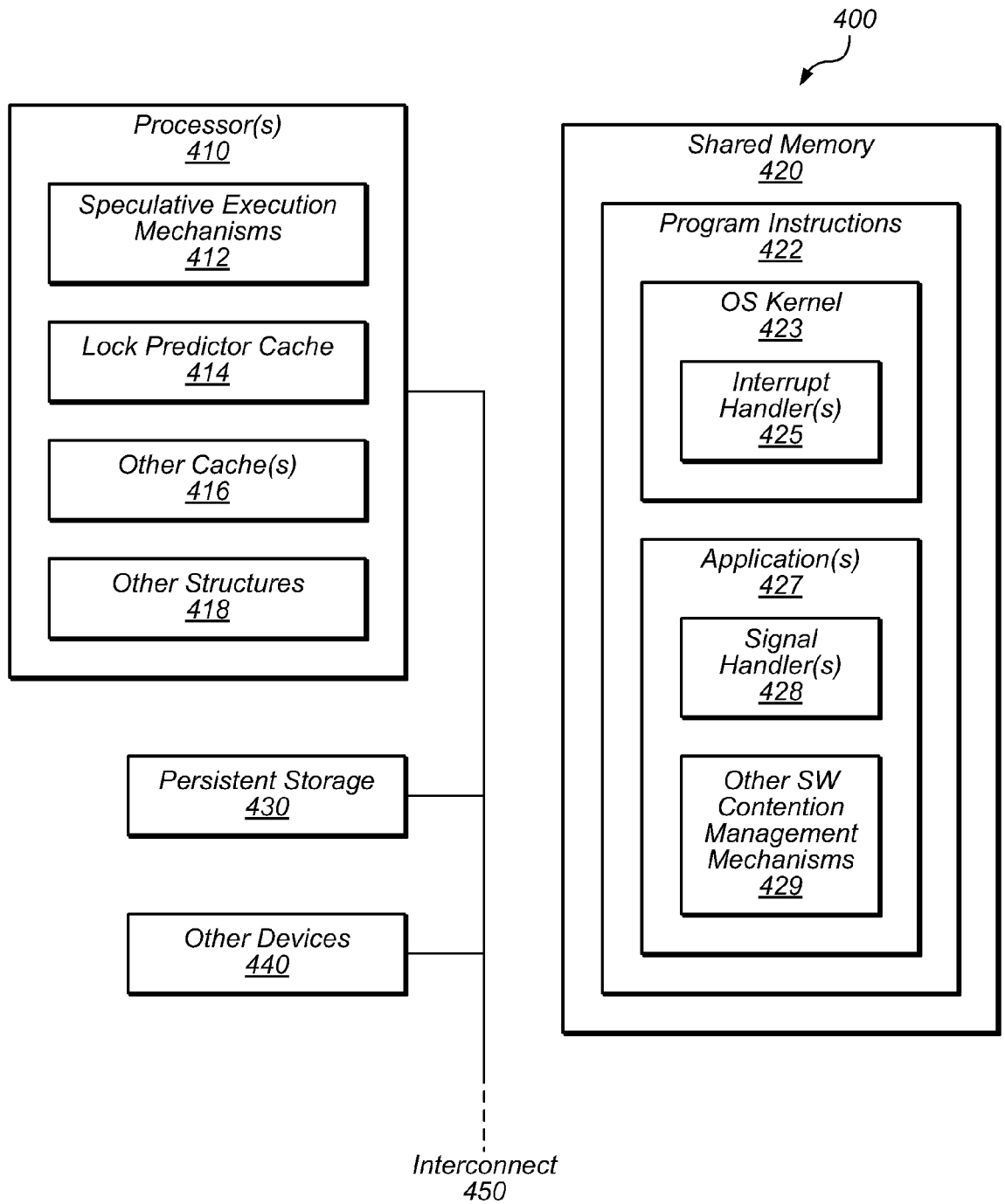
FIG. 4 is a block diagram of a computer system configured to implement SLE in combination with contention management mechanisms, according to various embodiments.

FIG. 4 illustrates one embodiment of a computer system 400 configured to implement SLE in combination with software and/or hardware contention management mechanisms as described herein. The computer system may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In the illustrated embodiment, computer system 400 comprises one or more processors 410, each possibly containing multiple cores. Each processor may be capable of simultaneous multi-threading (SMT), in which case, it may comprise two or more logical processors. In this example, each processor comprises speculative execution mechanisms 412, lock predictor cache 414, other data and/or instruction caches 416, and other hardware structures 418 (e.g., TLB). Speculative execution mechanisms 412 may correspond to logical entity 100 in FIG. 1. Lock predictor cache 414 may correspond in function to logical entity 110 in FIG. 1. In other embodiments, lock predictor cache 414 may be separate from the processor.

The computer system 400 may also include one or more persistent storage devices 430 (e.g. optical storage, magnetic storage, hard drive, tape drive, solid state memory, etc) and one or more system memories 420 (e.g., one or more of cache, SRAM, DRAM, RDRAM, EDO RAM, DDR 10 RAM, SDRAM, Rambus RAM, EEPROM, etc.). In various embodiments, computer system 400 may also include fewer or additional components not illustrated in FIG. 4 (e.g., video cards, audio cards, additional network interfaces, peripheral devices, a network interface such as an ATM interface, an Ethernet interface, a Frame Relay interface, a hardware-based contention management mechanism, etc.).

One or more of the system memories 420 may contain program instructions 422. Program instructions 422 may be encoded in platform native binary, any interpreted language such as Java™ byte-code, or in any other language such as C/C++, Java™, etc or any combination thereof.

Program instructions 422 may comprise one or more operating system kernels 423 and software applications 427. In some embodiments, the operating system and/or kernel may be virtual, such as a hypervisor or virtual machine monitor. The operating system kernel 423 may include one or more software contention management mechanisms, such as hardware interrupt handlers 425. For example, hardware interrupt handlers 425 may be configured to trap hardware interrupts and to perform contention management operations, as described herein. Each application 427 may include one or more software contention management mechanisms, such as signal handlers 428. Signal handlers 428 may be configured to handle interrupt signals from the kernel and/or from the hardware and to respond by performing contention management operations, as described herein. Applications may also include other software contention management mechanisms 429, which may execute and/or manage contention management functionality. For example, other software contention management mechanisms 429 may include shared contention management libraries invoked by signal handlers 428. The system memory may further comprise memory locations for storing shared and private variables and other data structures, such as transactional abort histories.

The system components, including the processors 410, shared memory 420, persistent storage devices 430, and other devices 440 may be connected via one or more interconnects 450. Interconnect 450 may be implemented as any broadcast, point-to-point, or hybrid communication mechanism such as a front side bus, Ethernet, InfiniBand™, etc.

Although the embodiments above have been described in considerable detail, numerous variations and modifications will become apparent to those skilled in the art once the above disclosure is fully appreciated. For example, although many of the embodiments are described in terms of SLE, it should be noted that the techniques and mechanisms disclosed herein may be applicable to other hardware-based transactional execution mechanisms. It is intended that the following claims be interpreted to embrace all such variations and modifications.

What is claimed:

1. A computer-implemented method, comprising:
   attempting to execute a section of code as a transaction using a hardware transactional memory system;
   the hardware transactional memory system detecting that the transaction aborted or will abort; and
   in response to said detecting:
       the hardware transactional memory system sending an indication of said detecting to a software contention management mechanism, wherein the software contention management mechanism is configured to reduce transaction abort rates, and wherein to reduce transaction abort rates the software contention management mechanism is configured to:
           determine an amount by which to delay an attempt to execute a critical section of code, wherein the determined amount by which to delay the attempt to execute the critical section of code is configurable; or
           limit the number of threads permitted to elide a lock over a given critical section of code at any one time;
       in response to receiving the indication, the software contention management mechanism determining a mode of execution to be used in one or more subsequent attempts to execute the section of code, wherein determining the mode of execution comprises determining whether to use a speculative transaction mode supported by the hardware transactional memory system or a non-speculative mode supported by the hardware transactional memory system;
       the software contention management mechanism communicating the determined mode of execution to the hardware transactional memory system; and
       the hardware transactional memory system attempting to execute the section of code using the determined mode of execution.

2. The method of claim 1, further comprising:
   if the determined mode of execution comprises a speculative transaction mode, the software contention management mechanism executing a concurrency throttling mechanism over the section of code.

3. The method of claim 1, wherein said communicating comprises updating a value in a lock predictor cache.

4. The method of claim 1, wherein the indication comprises a hardware interrupt signal.

5. The method of claim 1, wherein the software contention management mechanism comprises an interrupt handler.

6. The method of claim 1, further comprising:
   in response to receiving the indication, the software contention management mechanism sending a software interrupt signal to a signal handler; and
   in response to receiving the software interrupt signal, the signal handler executing a contention management operation.

7. The method of claim 6, wherein the signal handler corresponds to a sub-region of an application that includes the section of code, wherein signal handler does not correspond to a different sub-region of the application.

8. A system comprising:
   one or more processors;
   a memory coupled to the one or more processors and storing program instructions executable by one or more processors to implement a software contention management mechanism, wherein the software contention management mechanism is configured to reduce transaction abort rates, and wherein to reduce transaction abort rates the software contention management mechanism is configured to:
       determine an amount by which to delay an attempt to execute a critical section of code, wherein the determined amount by which to delay the attempt to execute the critical section of code is configurable; or
       limit the number of threads permitted to elide a lock over a given critical section of code at any one time; and
   a hardware transactional memory implementation;
   wherein the hardware transactional memory implementation is configured to:
       attempt to execute a given section of code as a respective transaction;
       detect that the respective transaction aborted or will abort; and
       in response to said detecting:
           send an indication of said detecting to the software contention management mechanism;
   wherein the software contention management mechanism is further configured to:
       in response to receiving an indication that a given transaction aborted or will abort, determine a mode of execution to be used in one or more subsequent attempts to execute a respective section of code, wherein determining the mode of execution comprises determining whether to use a speculative transaction mode supported by the hardware transactional memory implementation or a non-speculative mode supported by the hardware transactional memory implementation; and communicate the determined mode of execution to the hardware transactional memory implementation;

wherein the hardware transactional memory implementation is further configured to:

in response to receiving a determined mode of execution for a given section of code, attempt to execute the given section of code using the determined mode of execution.

9. The system of claim 8, wherein the software contention management mechanism is further configured to:

in response to determining that the mode of execution of the respective section of code comprises a speculative transaction mode, execute a concurrency throttling mechanism over the section of code.

10. The system of claim 8, wherein said communicating comprises updating a value in a lock predictor cache.

11. The system of claim 8, wherein the indication comprises a hardware interrupt signal.

12. The system of claim 8, wherein the software contention management mechanism comprises an interrupt handler.

13. The system of claim 8, wherein the program instructions are further executable by the one or more processors to implement a signal handler;

wherein the software contention management mechanism is further configured to:

in response to receiving the indication, send a software interrupt signal to the software interrupt handler; and wherein in response to receiving the software interrupt signal, the signal handler is configured to:

execute a contention management operation.

14. The system of claim 13, wherein the signal handler is corresponds to a sub-region of an application that includes the section of code, wherein signal handler does not correspond to a different sub-region of the application.

15. A non-transitory, computer-readable storage medium storing program instructions computer-executable to implement a software contention management mechanism;

wherein the software contention management mechanism is configured to reduce transaction abort rates, and wherein to reduce transaction abort rates the software contention management mechanism is configured to:

determine an amount by which to delay an attempt to execute a critical section of code, wherein the determined amount by which to delay the attempt to execute the critical section of code is configurable; or limit the number of threads permitted to elide a lock over a given critical section of code at any one time;

wherein the software contention management mechanism is further configured to:

receive an indication from a hardware transactional memory system that an attempt to execute a section of code as a transaction has been aborted or will be aborted;

in response to said receiving, determine a mode of execution for the section of code, wherein determining the mode of execution comprises determining whether to use a speculative transaction mode supported by the hardware transactional memory system or a non-speculative mode supported by the hardware transactional memory system; and communicate the determined mode of execution to the hardware transactional memory system.

16. The storage medium of claim 15, wherein the program instructions are further computer-executable to implement:

in response to determining that the mode of execution for the section of code comprises a speculative transaction mode, executing a concurrency throttling mechanism over the section of code.

17. The storage medium of claim 15, wherein said communicating comprises updating a value in a lock predictor cache.

18. The storage medium of claim 15, wherein the program instructions are further computer-executable to implement an interrupt handler.

19. The storage medium of claim 15, wherein the program instructions are further computer-executable to implement:

in response to said receiving, sending a software interrupt signal to a signal handler.

20. The storage medium of claim 15, wherein the program instructions are further computer-executable to implement a signal handler configured to:

in response to said receiving a software interrupt signal, execute a contention management operation.

* * * * *

UNITED STATES PATENT AND TRADEMARK OFFICE
CERTIFICATE OF CORRECTION

PATENT NO. : 8,914,620 B2  
APPLICATION NO. : 12/345162  
DATED : December 16, 2014  
INVENTOR(S) : Dice Page 1 of 1

It is certified that error appears in the above-identified patent and that said Letters Patent is hereby corrected as shown below:

In the Claims

In column 13, line 41, in Claim 14, after "handler" delete "is".

Signed and Sealed this
Fourth Day of August, 2015

Michelle K. Lee
*Director of the United States Patent and Trademark Office*